UNITED STATES PATENT OFFICE.

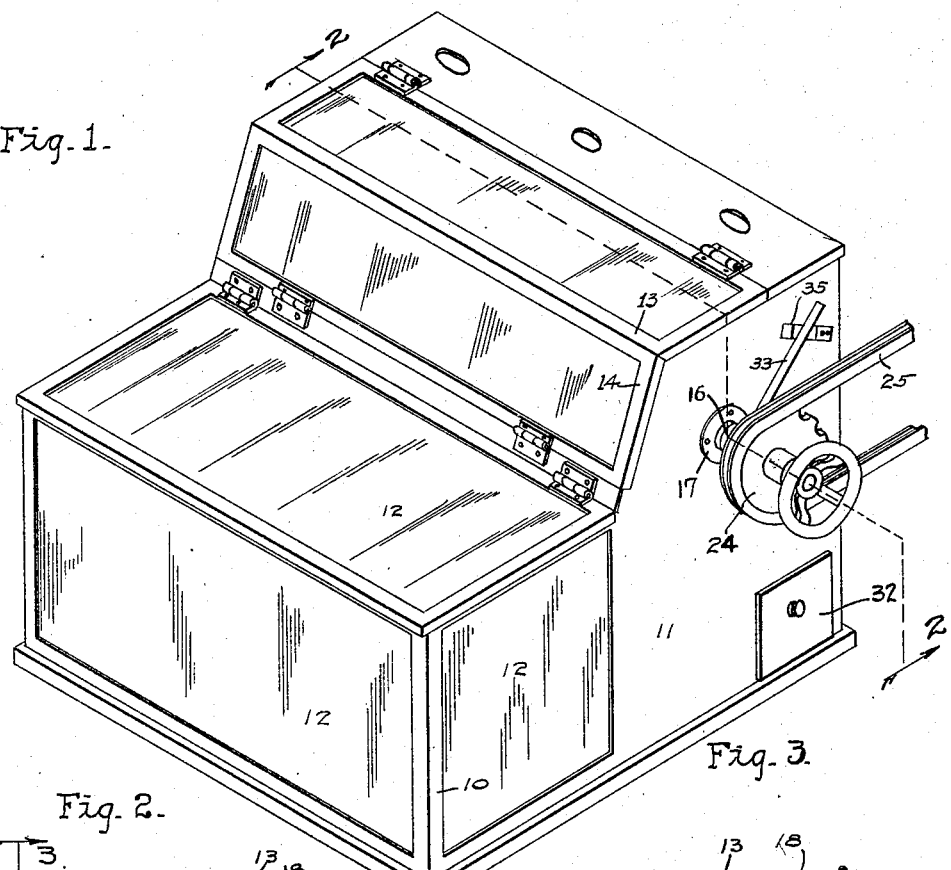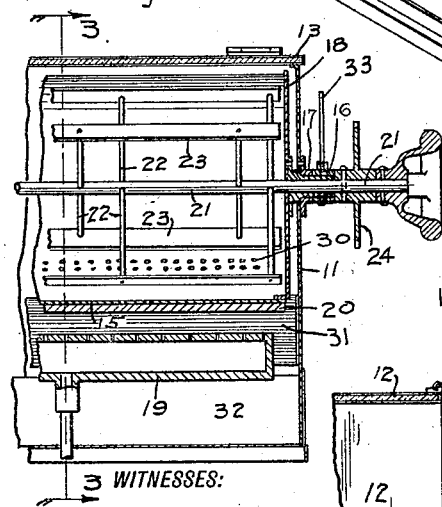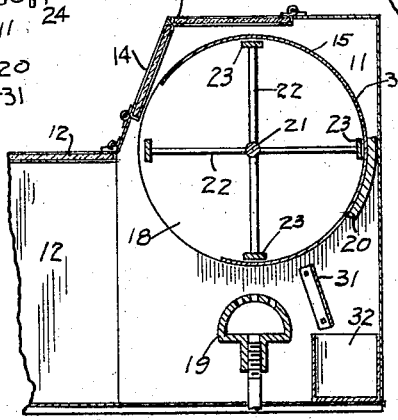

DANIEL H. TALBERT, OF INDIANAPOLIS, INDIANA, ASSIGNOR TO HOLCOMB & HOKE MANUFACTURING COMPANY, OF INDIANAPOLIS, INDIANA.

PEANUT-ROASTING MACHINE.

1,185,856.  Specification of Letters Patent.  Patented June 6, 1916.

Application filed May 17, 1915. Serial No. 28,718.

*To all whom it may concern:*

Be it known that I, DANIEL H. TALBERT, a citizen of the United States, and a resident of Indianapolis, county of Marion, and State of Indiana, have invented a certain new and useful Peanut-Roasting Machine; and I do hereby declare that the following is a full, clear, and exact description thereof, reference being had to the accompanying drawings, in which like letters refer to like parts.

The object of this invention is the improvement of machines for roasting peanuts and the like so as to render the operation visible, simplify the construction and mode of operation and facilitate the separation of the waste material.

One feature of the invention consists in forming the forward portion of the casing of glass for containing the peanuts or the like after they have been roasted and mounting to the rear of the same the roasting means, and the rear portion of the casing is provided with glass doors to render the same accessible. This arrangement makes both the apparatus and the roasted peanuts or the like within the device visible and attractive.

Another feature of the invention consists in mounting an oscillatory roaster below and to the rear of the glass door through which the roaster is accessible, with the upper front part of the roaster open, and securing to the underside of said roaster a deflector plate which is normally over a burner, that is, when the roaster is in the roasting position. This enables said roaster to be oscillated so as to discharge the material to the front of the burner. Furthermore, the roaster is provided with perforations on its underside to separate the waste material from the contents of the roaster and a receptacle for such waste material is provided in the rear part of the casing with a deflecting plate for deflecting the waste material as it falls from the roaster into the receptacle.

The full nature of the invention will be understood from the accompanying drawings and the following description and claims:

In the drawings, Figure 1 is a perspective view of the device. Fig. 2 is a substantially vertical section on the line 2—2 of Fig. 1, through the right-hand end of the machine. Fig. 3 is a vertical section on the line 3—3 of Fig. 2, the open position of the doors being indicated by dotted lines. Fig. 4 is the same as Fig. 3 with the cylinder in dumping position.

The casing of this machine consists of a frame 10, partial side walls 11 of metal or like material at the sides of the rear portion of which the machinery is mounted, and a forward extension therefrom with glass walls 12, forming a chamber for receiving peanuts and the like after the same have been roasted. The rear portion has a top glass door 13 and an inclined front door 14, the front edges of said doors meeting each other so that the two doors as they are opened will swing away from each other, as indicated in Fig. 3. When closed, the machinery is fully exposed and when open the machinery is accessible for operating on the same.

In the rear portion of the frame a cylinder 15 is mounted by means of tubular bearings 16 secured to the ends thereof and operating in tubular bearings 17 secured to the end walls 11 of the frame. The cylinder 15 is normally stationary. It has an open section 18 which normally registers with the openings in the frame which is closed by the doors 13 and 14. When these doors are open, as shown in Fig. 3, the peanuts to be roasted can readily be introduced into the roasting cylinder 15 and then the doors 13 and 14 are closed until it is desired to charge the roasting cylinder again.

The peanuts in the roasting cylinder are roasted by the heat from a gas burner 19 located in the lower part of the frame and there is a deflector plate 20 secured to the bottom of the roasting cylinder and immediately above the burner 19 to protect the roasting cylinder from the flames. Within the roasting cylinder there is a stirring reel consisting of a shaft 21, radial arms or spokes 22 and transverse bars 23 on the outer ends of said arms or spokes so that the same may be revolved in close proximity to the inner periphery of the roasting cylinder. The shaft 21 is mounted in the bearings 16 of a roasting cylinder so as to rotate therein and is driven by a sprocket wheel 24 and a belt 25 running from any suitable source of power.

The roasting cylinder 15 has throughout its length a series of perforations 30 located, when it is in a normal position, to the rear of the deflector plate 20 and above and to the rear of a plate 31 extending transversely of the machine and secured to the ends of the frame. The purpose of these perforations 30 is to admit of direct rays of heat entering the roasting cylinder, which more readily absorbs all moisture to enable the waste matter to be discharged from the cylinder during the roasting of the peanuts and the like and the stirring thereof by the stirring device, and such waste material is directed by the plate 31 into a waste chamber 32 at the bottom and to the rear of the machine.

After the peanuts have been introduced into the cylinder and the stirring device has stirred them therein, and the heating device has roasted the same, and the waste separating means has separated the waste therefrom and they are ready to be discharged from the cylinder, the roasting cylinder 15, which is normally stationary, is turned from the roasting position, shown in Fig. 3, to the discharging position, shown in Fig. 4, whereupon the roasted peanuts are discharged into the chamber in the forward part of the frame. The roasting cylinder is turned for discharging by a handle 33 secured to the bearing 16 of the roasting cylinder. After the roasted peanuts have been discharged, the roasting cylinder is returned to its roasting position and the lever 33 caught or held by a latch 35 on the end of the frame, as shown in Fig. 1, which holds the roasting cylinder in the roasting position shown in Fig. 3. The doors 13 and 14 are then opened, another charge of peanuts introduced, said doors closed and the roasting of the peanuts proceeded with, as heretofore explained.

The invention claimed is:

1. A machine for roasting peanuts and the like including a casing with a door in the upper part thereof, a roasting cylinder rotatably mounted in said casing and having a longitudinal opening therein adjacent said door when said cylinder is in normal position, whereby the peanuts and the like can be introduced into said cylinder through said door, means for stirring said peanuts within said cylinder, and means for tilting said cylinder for dumping the peanuts or the like after the same are roasted.

2. A machine for roasting peanuts and the like including a casing with a door in the upper part thereof, a roasting cylinder rotatably mounted in said casing and having a longitudinal opening therein adjacent said door when said cylinder is in normal position, a bearing sleeve secured to each end of said cylinder, a bearing sleeve secured to the ends of the casing in which the bearing sleeves on the cylinder are located, a shaft extending through the cylinder and rotatably mounted in the bearing sleeve secured to the cylinder, stirring means secured to said shaft within said cylinder, external means for operating said shaft, and means for holding the cylinder stationary and tilting it.

3. A machine for roasting peanuts and the like including a casing with a door in the upper part thereof, a roasting cylinder rotatably mounted in said casing and having a longitudinal opening therein adjacent said door when said cylinder is in normal position, a bearing sleeve secured to each end of said cylinder, a bearing sleeve secured to the ends of the casing in which the bearing sleeves on the cylinder are located, a shaft extending through the cylinder and rotatably mounted in the bearing through the cylinder and rotatably mounted in the bearing sleeve secured to the cylinder, stirring means secured to said shaft within said cylinder, a lever secured to said bearing sleeve on the cylinder and projecting through a slot in the bearing sleeve on the casing, and means on the casing for holding said lever and thereby maintaining the roasting cylinder in its normal position.

4. A machine for roasting peanuts and the like including a casing having a front portion for the roasted peanuts and the like, doors in the upper front part of the rear portion, a roasting cylinder mounted in the upper part of said rear portion with a longitudinal opening adjacent said doors, means for holding said cylinder stationary and turning it for dumping its contents after the same is roasted in the forward portion of the casing, and heating means located in the lower rear portion of the casing.

5. A machine for roasting peanuts and the like including a casing, a cylinder mounted so as to be stationary while the peanuts are roasted and having perforations in the lower part thereof for the escape of waste, stirring means within the cylinder for facilitating the escape of waste material through said perforations, and a receptacle in said casing below said perforations for receiving the waste material discharged from said cylinder.

6. A machine for roasting peanuts and the like including a casing, a cylinder mounted so as to be stationary while the peanuts are roasted and having perforations in the lower part thereof for the escape of waste, stirring means within the cylinder for facilitating the escape of waste material through said perforations, heating means below said cylinder, a deflecting plate between said heating means and cylinder and in front of said perforations, a receptacle in the casing to the rear of said heating means, and a plate for deflecting the waste material coming from said cylinder into said receptacle.

In witness whereof, I have hereunto affixed my signature in the presence of the witness herein named.

DANIEL H. TALBERT.

Witness:
J. H. WELLS.